United States Patent [19]

Mustaphi

[11] 3,963,964

[45] June 15, 1976

[54] SEGREGATED PHASE COMPARISON SYSTEM

[75] Inventor: Kalyan K. Mustaphi, Minneapolis, Minn.

[73] Assignee: Westinghouse Electric Corporation, Pittsburgh, Pa.

[22] Filed: Feb. 7, 1975

[21] Appl. No.: 548,130

[52] U.S. Cl. .......................... 317/27 R; 317/29 A; 317/36 D
[51] Int. Cl.² ........................................ H02H 3/28
[58] Field of Search .............. 317/27 R, 29 A, 36 D

[56] References Cited
UNITED STATES PATENTS

| | | | |
|---|---|---|---|
| 3,339,115 | 8/1967 | Calhoun | 317/36 D |
| 3,882,361 | 5/1975 | Hinman | 317/29 A |
| 3,893,008 | 7/1975 | Strickland et al. | 317/29 A |

*Primary Examiner*—J D Miller
*Assistant Examiner*—Harry E. Moose, Jr.
*Attorney, Agent, or Firm*—S. A. Seinberg

[57] ABSTRACT

This disclosure relates to phase comparison relaying systems for a three phase power transmission line in which the current is measured at each end of each phase conductor. The phasor difference of the currents in a selected two of the phase conductors is determined at each end of the selected conductors and is phase compared to determine the location of phase-to-phase faults whether or not a ground fault is involved while the phasor sum of the current in all three of the phase conductors is determined at each end of the phase conductors and is phase compared to determine the location of phase-to-ground faults.

6 Claims, 2 Drawing Figures

SEGREGATED PHASE COMPARISON SYSTEM

CROSS-REFERENCE TO RELATED APPLICATIONS

The following copending applications Ser. No. 548,135 filed on Feb. 7, 1975, (Westinghouse Electric Corporation Case 45,364) and Ser. No. 548,132 filed on Feb. 7, 1975, (Westinghouse Electric Corporation Case 45,369).

BRIEF SUMMARY OF THE INVENTION

The basic segregated phase comparison relaying system is described in application for U.S. Pat. Ser. No. 402,687 filed Oct. 2, 1973, now U.S. Pat. No. 3,893,008, as a continuation of Ser. No. 295,031 filed Oct. 4, 1972, now abandoned. This relaying system individually phase compares the current at each end of each phase conductor and phase compares the ground or residual fault current at each end of the protected power line section to determine whether the fault is internal of or external of the protected line section. It is also known that one of the illustrated comparisons is somewhat redundant. In the case of a phase-to-phase fault the fault current flows in both of the faulted conductors and one thereof is sufficient to determine the fault location.

Similarly, in the case of a phase-to-ground fault, the fault current will flow through the faulted conductor and under many circumstances may be used to determine its location. However, under some phase-to-ground faults and particularly those in which the fault current is small the comparison of the phase currents in the faulted conductor may not be sensitive enough to provide the desired protection. Since under normal nonfault conditions no ground current flows, the ground fault detecting and phase comparing means may be extremely sensitive without the probability of an excessive number of false trips.

In accordance with my invention, the sensitive phase-to-ground fault detecting and current comparing means is retained. I have, however, eliminated the necessity of being at least two phase-to-phase fault detecting and current comparing means and have substituted therefore a single fault detecting and current comparing means. The invention not only reduces the number of fault detecting and phase comparing means but additionally reduces the number of communicating channels between the ends of the protected line sections to not more than two in each direction as compared with a minimum of three in each direction as was formerly required. In accordance with this invention the location of the phase-to-phase faults whether or not a ground fault is involved are determined by comparing the phasor difference of the current in two of the transmission line conductors whereby a phase-to-phase fault of any two conductors and the location thereof is readily obtained at reduced cost and reduced use of intelligence transmitting channels. These channels are not only costly but with the increased use thereof channels which will not interfere with each other and/or with channels used for or assigned for other uses, especially radio or power line carrier channels or telephone lines.

DESCRIPTION OF THE PREFERRED EMBODIMENTS

Figure 1:
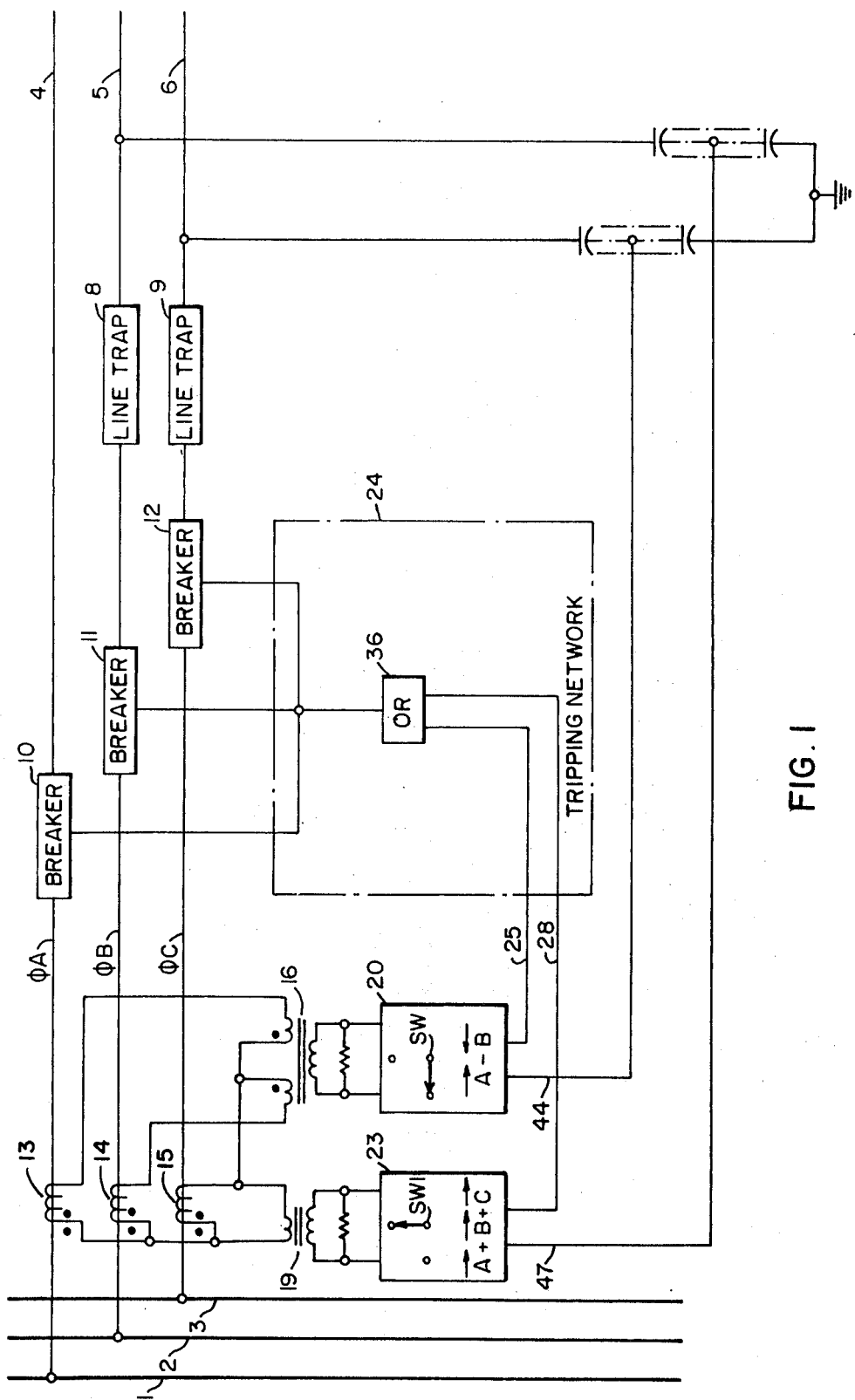
FIG. 1 is a block diagram illustrating one terminal of a phase comparison relay system embodying the invention; and, FIG. 2 is an expanded block diagram of one of the fault detecting and current sensing blocks of FIG. 1.

Referring to the drawings by characters of reference, the numerals 1, 2 and 3 designate respectively the three buses energized from one or more sources of energy. These buses 1, 2 and 3 are connected to phase conductors 4, 5 and 6, respectively, of a protected line section through line traps 8 and 9 and breakers 10, 11 and 12. The conductors 4, 5 and 6 have their other end portions connected through breakers to remote buses supplied with power from one or more other sources (not shown). The relay apparatus located at each end of the phase conductors 4, 5 and 6 are identical and only the one illustrated adjacent to buses 1, 2 and 3 is illustrated.

Current transformers 13, 14 and 15 are associated respectively with the phase conductors 4, 5, and 6 and are connected through isolating current transformers 16 and 19 to the phase and ground relaying networks 20 and 23 respectively. The current transformers 13 and 14 are connected individually to the two primary windings of an isolating transformer 16 and as indicated by the dots are connected in opposition so that the transformer 16 is energized by the phasor difference of the currents in the conductors 4 and 5. An isolating transformer 19 is connected to be energized by the residual or ground fault current which might occur from a grounded phase conductor. The isolating transformer 16 and 19 energize loading resistors whereby voltage quantities are supplied to networks 20 and 23 which have a magnitude that is proportional to the phasor difference of the currents in the lines 4 and 5 and the ground fault of current respectively. The networks 20 and 23 are identical except that the residual network 23 has its switch SW1 in a position such that the fault current is detected by the $I_L$ overcurrent network 60 rather than by the fault detector 58 in the network 20.

The networks 20 and 23 are provided with output conductors 25 and 28 which are connected individually to the two input terminals of an OR network 36 of the tripping network 24. The output of the OR network 36 is connected to each of the breakers 10, 11 and 12 so that upon the occurrence of a logical 1 signal on either the output conductors 25 or 28 all of the breakers 10, 11 and 12 will be tripped to disconnect the phase conductors 4, 5 or 6 from the buses 1, 2 and 3. In the event of the phase-to-phase faulting whether or not a ground fault occurs on two or more conductors 4, 5 or 6 the network 20 or 23 will be actuated to cause its output conductor 25 or 28, as the case may be, to supply a logical 1 signal as will be pointed out more particularly below.

Figure 2:
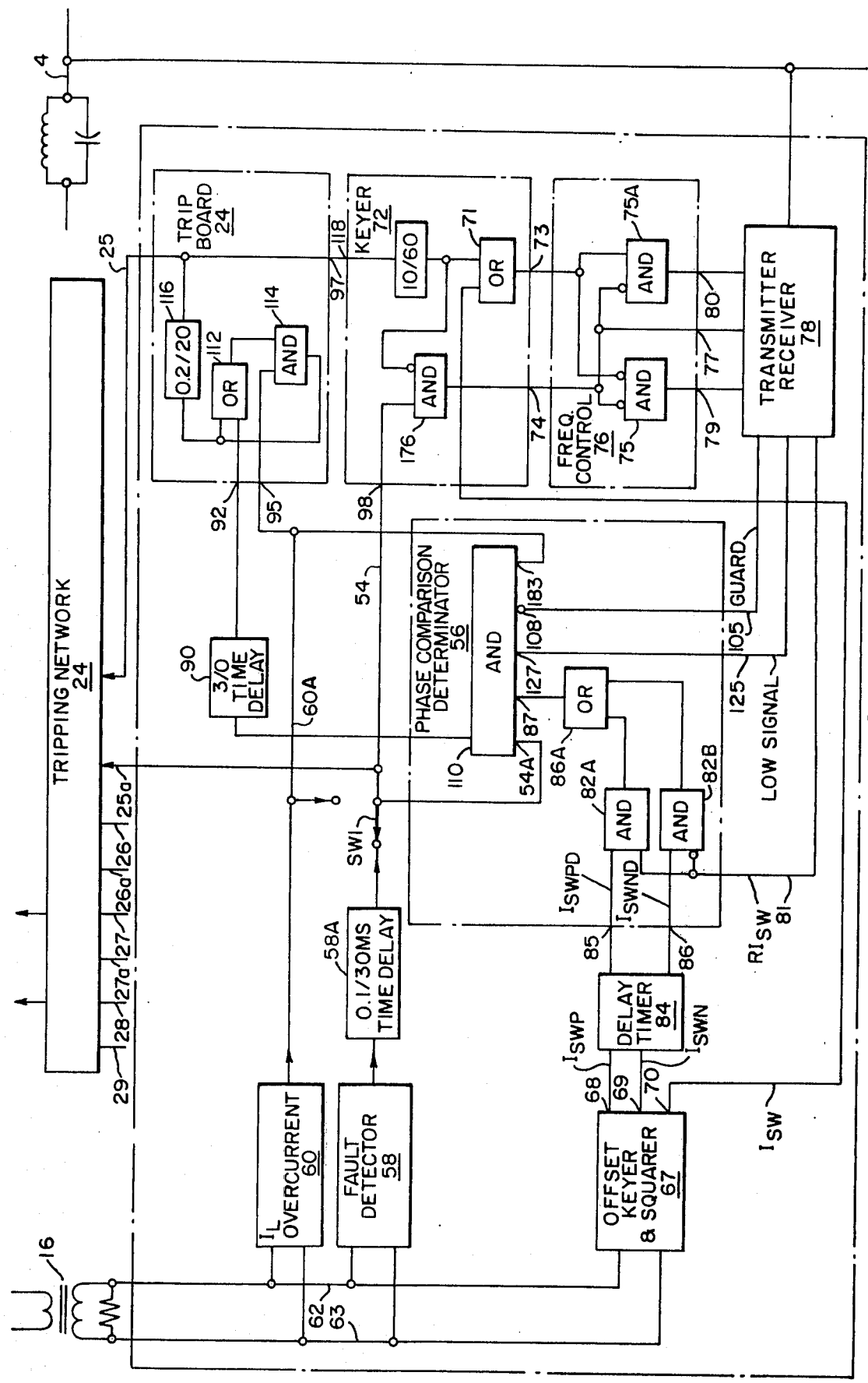

The network 20 is more completely shown in FIG. 2 and includes a fault detector 58 which provides a logical 1 output signal when any multi-phase fault occurs. The fault detector may take any of various forms, one of which may be the fault detector shown and described in U.S. Pat. No. 3,654,516, dated Apr. 4, 1972 to M. Traversi. The output of the fault detector 58 is connected to a time delay 58A and a conductor 54 to one terminal 54A of the AND network 110 (the switch SW1 being in its illustrated position) and provides a first enabling signal to the AND network 110.

An $I_L$ overcurrent network 60 energized from the buses 62 and 63 is connected by a conductor 60A to a second input terminal 183 of the AND network 110. The $I_L$ overcurrent network 60 may take any desired form in which a logical 1 signal will be provided at all times that the input signal from buses 62 and 63 represents a line current greater than a predetermined minimum current which, for example, may be the maximum expected charging current of the conductor 4. The conductor 60A is also connected to the input terminal 95 of the trip board 24 and therefrom to one input terminal of AND network 114. The output terminal of the AND network 114 is connected through a timer 116 to the output conductor 25. With this arrangement the trip board 24 can never supply a tripping signal to the tripping network 24 unless and until the $I_L$ overcurrent network 60 supplies a logical 1 signal.

The transmitter receiver 78, when it is receiving a signal from the remote transmitter receiver of at least a minimum magnitude, provides a logical 1 signal to its output conductor 125 which is applied to a third input terminal 127 of the AND network 110. If the transmitter receiver 78 fails to receive a signal of sufficient strength, the resulting logical 0 signal on the input terminal 127 will prevent a logical 1 signal at the output of the AND network 110. When the transmitter receiver 78 is receiving a guard signal from the remote transmitter receiver, a logical 1 signal will be supplied to its output conductor 105 and thereby to the NOT input terminal 108 of the AND network 110. The AND network 110 will be enabled to provide an output signal solely in the absence of reception of a guard signal by the transmitter receiver 78.

Under normal non-fault conditions, no $RI_{SW}$ signal will be supplied by the transmitter receiver 78 over its output conductor 81 to the normal and NOT input terminals of the AND networks 82A and 82B respectively. The $RI_{SW}$ signal comprises a series of alternating logical 1 and 0 signals indicating the instantaneous polarities of the current at the remote location. The AND networks 82A and 82B serve as current comparison devices for comparing the phase of the current at the remote end of the line as supplied to the conductor 81 with the phase of the current supplied locally through the transformer 16 to the keyer and squarer 57. Suffice for the present is to state that a logical 1 signal will be supplied to its output conductor 68 during at least a portion of the positive half cycle of the buses 62 and 63, and a logical 1 signal will be supplied at its output conductor 69 during at least a portion of the negative half cycle of the quantities between the conductors 62 and 63. These output signals are delayed in the usual manner by the delay timer 84 and are supplied to the input terminals 85 and 86 of the phase comparison determinator 56 and therefrom to the normal input terminals of the AND networks 82A and 82B respectively.

When logical 1 signals are supplied currently to both of the input terminals of the AND network 82A the OR network 86A will provide a logical 1 signal to the input terminal 87 of the AND network 110. Similarly, when a logical 1 signal is supplied to the terminal 86 and a logical 0 signal is supplied concurrently by the conductor 81 to the AND network 82B a logical 1 output signal will also be supplied to the OR network 86A which provides a logical 1 signal to the input terminal 87. Since the absence of an $RI_{SW}$ signal is a logical 0 signal, the AND network 82B will periodically provide logical 1 signals to the OR network 86A and thereby to the input terminal 87 of the AND network 110; but in the absence of an enabling logical 1 signal at the input terminal 54A, and the presence of a logical 1 guard signal at the NOT input terminal 108, the AND network 110 remains ineffective to provide any logical 1 output signals to the delay timer 90 to initiate its timing. The keyer and squarer 67 provides an $I_{SW}$ signal on its output conductor 70 and therefrom to one input terminal of the OR network 71 of the keyer 72. This $I_{SW}$ signal comprises a series of logical 1 and logical 0 signals as determined by the polarity of the current signal supplied by the transformer 16.

In the absence of a fault, a logical 0 signal will be supplied over the conductor 54 to the input terminal 98 of the keyer 72 and therefrom to a first NOT input terminal of the AND network 176. The other NOT input terminal of the AND network 176 is connected to the output of the 10/60 timer which normally provides a logical 0 signal. The AND network 176 during non-fault operation therefore provides a logical 1 signal through the output conductor 74 to the NOT input terminal of the AND network 75 and 75A of the frequency control 76. This logical 1 signal disables both of the AND networks 75 and 75A so that during normal operation logical 0 output signals are supplied by the conductors 79 and 80 to the transmitter receiver 78. The logical 1 signal, normally supplied by the AND network 176, is conducted by output conductor 77 of the frequency control 76 to the transmitter receiver 78.

The transmitter receiver 78 may take any form in which it will transmit a guard signal in response to a logical 1 input signal on the conductor 77 and will supply alternately trip-positive and trip-negative signals in response to the alternating logical 1 logical 0 signals on the conductors 79 and 80 which occur when a logical 0 signal is supplied to the output conductor 77 from the AND network 176.

When a multi-phase fault occurs, the output signal supplied by the transformer 16 to the conductors 62 and 63 will indicate a multi-phase fault and a logical 1 signal will be supplied by the fault detector 58 to the input terminal 54A of the AND network 110 and to the input terminal 98 of the keyer 72. When this occurs, the AND network 176 provides a logical 0 signal to the conductor 77 and to the NOT input terminals of the AND networks 75 and 75A. At this same time the $I_{SW}$ signal will be supplied to the OR network 71 and the output conductor 73 of the keyer 72 will provide a series of logical 1 and logical 0 output signals to the second NOT input terminal of the AND network 75 and to the normal input terminal of the AND network 75A whereby the output conductors 79 and 80 will be sequentially energized by the logical 1 and logical 0 signals. This coupled with the logical 0 signal on conductor 77 causes the transmitter 78 to transmit the trip-positive and the trip-negative frequencies to the transmitter receiver at the remote buses.

Assuming that the network at the remote location has detected the fault and has interrupted its transmission of the guard signal and is transmitting its $RI_{SW}$ signal, the transmitter receiver 78 will supply a logical 0 signal to the NOT input terminal 108 of the AND network 110. Further, assuming that the received signal is of sufficient strength, a logical 1 signal will be supplied to the input terminal 127 of the AND network 110 and alternating logical 1 and logical 0 signals representing the quantity $RI_{SW}$ will be supplied to the phase comparing AND networks 82A and 82B. If the fault is internal to the protected line section, the logical 1 signal of the $RI_{SW}$ quantity will occur concurrently with the logical 1 signal of the $I_{SWPO}$ quantity and the logical 0 signal of the $RI_{SW}$ quantity will occur concurrently with the logical 1 signal of the $I_{SWND}$ quantity. The logical 1 output signals from the AND networks 82A and 82B are supplied to the OR network 86A and thereby to the input terminal 87 of the AND network 110. The AND network 110 being satisfied supplies a logical 1 input signal to the time delay 90 which immediately commences to time out.

If the logical 1 signal exists for a 3 m.s. timing period, a logical 1 signal will be supplied by the time delay 90 through the input terminal 92 of the trip board 24 to one input terminal of the OR network 112. The resulting logical 1 output of the OR network 112 is supplied to the second input terminal of the AND network 114 which because of the logical 1 signal being supplied to the network 60 will supply logical 1 input signal to the other input terminal of the OR network 112 to maintain the AND network effective to continue logical 1 output and to the input of the 0.2/20 m.s. timer 116. When the timer 116 times out it supplies a logical 1 signal to the output conductor 25. As discussed above, and as will be apparent from FIG. 1, this logical output signal is supplied to the OR network 36 which thereby supplies a logical 1 or tripping signal to the breaker 10, 11 and 12 causing them to open and disconnect the conductors 4, 5 and 6 from the buses 1, 2 and 3 respectively.

If the fault which occurs is a phase-to-ground fault and assuming for example that it occurred on conductor 6, the network 23 which has its switch SW1 connected to utilize $I_L$ overcurrent network 60 as a fault detector would "see" the fault and would apply the logical 1 output signal on its conductor 28 (which is equivalent to the conductor 25 of the network 20) to the other input terminal of the OR network 36 so that the logical 1 output signal of the OR network 36 will cause each of the breakers 10, 11 and 12 to trip.

The operation is substantially identical to that described in the said copending application Ser. No. 402,687 except that in said copending application there is a separate one of the phase networks for each one of the phase conductors 4, 5 and 6 as well as the ground network 23 so that four separate signals must be transmitted from each end of the protected line section to the other end for phase comparison of the currents to determine whether the fault is within the protected or external to the protected line section.

In accordance with the teachings of this invention the phasor difference of two of the phase conductors is supplied to the phase network 20 and this will respond to all multi-phase faults irrespective of which phases are involved. With this arrangement, however, it is impossible to determine which of the two phases conductors are faulted together and therefore the tripping network 24 is arranged to trip each of the breakers 10, 11 and 12 upon the occurrence of any multi-phase fault.

Similarly with this arrangement the network 23 will respond to any ground fault irrespective of which of the phase conductors are faulted to ground and similarly if the fault is internal the tripping network 24 will trip all of the three breakers 10, 11 and 12.

The main advantage as illustrated in this application is that only two signals must be transmitted from each end of the line section to determine the location of the fault and if the fault is internal the tripping of the breakers at each end of the protected line section.

What is claimed and is desired to be secured by United States Letters Patent is as follows:

1. A phase comparing relay for protecting a line section of a three phase power transmitting network, said relay comprising, a plurality of current sensing means, a first and a second and a third of said sensing means being individually associated with the phase conductors of said line section at a first location therealong and providing output current quantities proportional to the phase and magnitude of the current in the said phase conductor with which it is associated, first current quantity summing means connected to said first and said second sensing means and providing a first output signal which is a measure of the phasor difference of said current quantities of said first and second sensing means, second current quantity summing means connected to said first and second and third sensing means and providing a second output signal which is a measure of the phasor sum of said current quantities of said first and second and third sensing means, a first and a second signal comparing means, a first signal receiving means adapted to receive a first and a second transmitter signal, circuit means interconnecting said first and second comparing means with said first and second summing means respectively and with said first receiving means for energization of said first comparing means with said first output signal and said first transmitted signal and for energization of said second comparing means with said second output signals and said second transmitted signal, a first actuating circuit connected to said first and second comparing means, each of said first and second comparing means being effective to actuate said first actuating circuit at predetermined relationships of the said signals supplied thereto.

2. The relay of claim 1 including a first transmitter means connected to said summing means for transmitting a third and a fourth transmitted signal as determined by said first and second output current quantities of said first and second summing means.

3. The relay of claim 2 including a fourth and fifth and sixth current sensing means, said fourth and fifth and sixth sensing means being associated with the phase conductors of said line section at a location therealong spaced from said first location and providing output current quantities proportional to the phase and magnitude of the current in the said phase conductor with which it is associated, a third current quantity summing means connected to said fourth and said fifth sensing means and providing a third output signal which is a measure of the phasor difference of said current quantities of said fourth and said fifth sensing means, a fourth current quantity summing means connected to said fourth and fifth and sixth sensing means and providing a fourth output signal which is a measure of phasor sum of said current quantities of said fourth and fifth and sixth sensing means, third and fourth signal comparing means, a second signal receiving means adapted to receive a third and a fourth transmitted signal, circuit means interconnecting said third and fourth comparing means with said third and fourth summing means respectively and with said second receiving means for energization of said third comparing means with said third output signal and said third transmitted signal and for energization of said fourth comparing means with said fourth output signal and said fourth transmitted signal, a second actuating circuit connected to said third and fourth comparing means, each of said third and fourth comparing means being effective to actuate said second actuating circuit at selected relationships of the said signals supplied thereto, a first transmitting means connected to said first and second summing means and effective to transmit said third and said fourth transmitted signals to said second receiving means under control of said first and said second output signals, and a second transmitting means connected to said third and fourth summing means and effective to transmit said first and said second transmitted signals to said first receiving means under control of said third and fourth output signals.

4. The method of comparing the relative phase of the current at the opposite end portions of a three conductor three phase power transmission line section, said method comprising the steps of obtaining first and second phasor quantities proportional to the phasor difference of the current of two of the conductors existing at substantially concurrently first and second end portions of the line section, of comparing the phase of said first and said second phasor quantities to determine whether a conductor-to-conductor fault is internal to or external to the line section, of obtaining third and fourth phasor quantities proportional to the phasor sum of the current in the three conductors existing substantially concurrently at said first and said second end portions of the line section, of comparing the phase of said third and said fourth phasor quantities to determine whether a conductor-to-ground fault is internal to or external to the line section, and of preventing the disconnecting of the line section from its power source unless at least one of said comparisons determines that the fault is internal to said line section.

5. The method of claim 4 in which the steps of determining the location of the fault determining the fault to be internal only when at least one set of the compared phasor quantities indicate that the fault current is into the line section at each of its end portions.

6. The method of claim 4 including the additional steps of permitting the disconnecting of the line section solely when the current in at least one conductor of the line section is a fault responsive current and then only when at least one of said comparisons determines that the fault is internal to said line section.

* * * * *